(12) United States Patent
Yamanashi

(10) Patent No.: US 6,476,888 B2
(45) Date of Patent: *Nov. 5, 2002

(54) REFLECTING COLOR POLARIZED LIGHT FILTER WITH COLOR FILTER HAVING POLARIZED LIGHT FUNCTION AND LIQUID CRYSTAL DISPLAY DEVICE

(75) Inventor: Fumiaki Yamanashi, Fukushima-ken (JP)

(73) Assignee: Alps Electric Co., Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/427,345

(22) Filed: Oct. 26, 1999

(65) Prior Publication Data

US 2002/0015122 A1 Feb. 7, 2002

Related U.S. Application Data

(62) Division of application No. 08/987,906, filed on Dec. 9, 1997, now Pat. No. 6,259,499.

(30) Foreign Application Priority Data

Dec. 9, 1996 (JP) .............................................. 8-328957

(51) Int. Cl.⁷ .......................................... G02F 1/1335
(52) U.S. Cl. ......................... 349/106; 349/113; 349/97
(58) Field of Search ........................ 349/106, 97, 113, 349/96, 108

(56) References Cited

U.S. PATENT DOCUMENTS 4,448,823 A * 5/1984 Clifford ........................ 428/1
4,560,241 A * 12/1985 Stolov et al. ............ 350/339 R
4,610,507 A * 9/1986 Kamamori et al. ......... 350/335
4,877,309 A * 10/1989 Takamatsu .................. 350/337

(List continued on next page.)

FOREIGN PATENT DOCUMENTS

| JP | 58-95325 | * | 6/1983 |
| JP | 63-97902 | * | 4/1988 |
| JP | 6-222350 |   | 8/1994 |

Primary Examiner—William L. Sikes
Assistant Examiner—Tarifur R. Chowdhury
(74) Attorney, Agent, or Firm—Brinks Hofer Gilson & Lione

(57) ABSTRACT

A reflecting color liquid crystal display device including a liquid crystal layer between a pair of opposing liquid crystal orientation films; transparent electrodes provided at outer surfaces of the orientation films; an upper glass base, a phase difference plate, and a front polarizing plate, which are laminated successively on an outer surface of one of the transparent electrodes; and a reflecting color polarized light filter provided at an outer surface of the other of the transparent electrodes, either directly or through an overcoat layer, such that a face of a polarized light color filter portion is in correspondence with the other of the transparent electrodes. Also disclosed is a reflecting color polarized filter including a reflecting layer provided at one face of a glass base, and a polarized light color filter portion provided on the reflecting layer. The reflecting color liquid crystal display device has at least the first of the two following characteristics: (1) capability of displaying dark and vivid colors, and (2) capability of displaying multiple colors. The reflecting color polarized light filter can be used in the reflecting color liquid crystal display device having such a characteristic.

40 Claims, 12 Drawing Sheets

U.S. PATENT DOCUMENTS

| | | | | |
|---|---|---|---|---|
| 4,968,120 A | * | 11/1990 | Depp et al. | 350/337 |
| 5,299,289 A | | 3/1994 | Omae et al. | 359/95 |
| 5,568,293 A | | 10/1996 | Takao et al. | 356/68 |
| 5,587,819 A | * | 12/1996 | Sunohara et al. | 349/106 |
| 5,667,920 A | * | 9/1997 | Chiulli et al. | 430/7 |
| 5,686,931 A | * | 11/1997 | Funfschilling et al. | 345/88 |
| 5,699,135 A | * | 12/1997 | Hisatake et al. | 349/113 |
| 5,729,313 A | | 3/1998 | Mitsui | 349/106 |
| 5,734,457 A | | 3/1998 | Mitsui et al. | 349/106 |
| 5,751,483 A | * | 5/1998 | Itoh et al. | 359/502 |
| 5,760,860 A | * | 6/1998 | Mason et al. | 349/86 |
| 5,818,554 A | * | 10/1998 | Hiyama et al. | 349/67 |
| 5,847,791 A | * | 12/1998 | Hao | 349/106 |
| 5,897,184 A | * | 4/1999 | Eichenlaub et al. | 349/64 |
| 5,903,329 A | * | 5/1999 | Yoshida et al. | 349/106 |
| 6,016,178 A | * | 1/2000 | Kataoka et al. | 349/117 |
| 6,084,647 A | * | 7/2000 | Hatano et al. | 349/15 |
| 6,130,734 A | * | 10/2000 | Fujita et al. | 349/97 |

* cited by examiner

REFLECTING COLOR POLARIZED LIGHT FILTER WITH COLOR FILTER HAVING POLARIZED LIGHT FUNCTION AND LIQUID CRYSTAL DISPLAY DEVICE

BACKGROUND OF THE INVENTION

1. Field of the Invention

The present invention is a divisional of application Ser. No. 08/987,906, entitled "REFLECTING COLOR POLARIZED LIGHT FILTER AND REFLECTING COLOR LIQUID CRYSTAL DISPLAY DEVICE USING THE SAME," filed on Dec. 9, 1997, now U.S. Pat. No. 6,259,499, which relates to a reflecting color polarized light filter suitable for use in an electro-optical liquid crystal display device, and a reflecting color liquid crystal display device using the same.

2. Description of the Related Art

FIG. 18 is a view showing a conventional reflecting color liquid crystal display device. In general, the structure of this reflecting color liquid crystal display device includes a reflecting mode super-twisted nematic (STN) liquid crystal panel 72, and a phase difference plate 73, both of which are laminated onto a lower polarizing plate 71a of a reflecting plate 71, and a front polarizing plate 74 that is laminated onto the phase difference plate 73.

In general, the liquid crystal panel 72 is a laminated structure formed by successively laminating a first glass base 75, a color filter 76, a silica or acrylic resin overcoat layer 77, a first transparent electrode layer 78, a first orientation film 79, a second orientation film 80 opposing the first orientation film 79 and separated therefrom by a gap, a second transparent electrode layer 81, and a second glass base 82, with a liquid crystal layer 83 provided between the first and second orientation films 79 and 80. Conventionally, the color filter 76 is one having pixels of three types of primary colors, red, green, and blue, formed in accordance with a predetermined pattern onto the first glass base 75 by photolithography techniques.

In order to obtain a bright display screen, the color filter 76 used in the conventional reflecting color liquid crystal display device is one having high transmissivity. This causes the display colors to appear light and less vivid.

SUMMARY OF THE INVENTION

Accordingly, in view of the above-described problem, it is an object of the present invention to provide a reflecting color liquid crystal display device having at least the first of the two following characteristics: (1) capability of displaying dark and vivid colors, and (2) capability of displaying multiple colors. In addition, it is an object of the present invention to provide a reflecting color polarized light filter for use in the reflecting color liquid crystal display device having such a characteristic.

To this end, according to one aspect of the invention, there is provided a reflecting color polarized light filter comprising a glass base, a reflecting layer provided at one face of the glass base, and a polarized light color filter portion provided on the reflecting layer.

According to another aspect of the invention, there is provided a reflecting color polarized light filter comprising a glass base, a polarized light color filter portion provided at one face of the glass base, and a reflecting layer provided at the other face of the glass base.

Although not exclusive, the reflecting layer may correspond to a rough surface of the glass base.

Although not exclusive, the reflecting color polarized light filter may further comprise a metal film and a transparent insulating layer formed on the rough surface.

Although not exclusive, the reflecting layer, made of plastic, may have a surface with projections and depressions.

Although not exclusive, the plastic reflecting layer may be adhered to the glass base through a transparent adhesive layer.

Although not exclusive, the polarized light color filter portion may have pixels arranged in any one of a stripe-type arrangement, a delta-type arrangement, and a mosaic-type arrangement, with the stripe-type arrangement having each of the pixels of three types of primary colors, red, blue, and green, arranged successively side by side, the delta-type arrangement having each of the pixels of the three types of primary colors arranged in a triangular shape, and the mosaic-type arrangement having each of the pixels of the three types of primary colors arranged successively side by side in a vertical direction and a horizontal direction.

Although not exclusive, the polarized light color filter portion may have pixels arranged in either one of a stripe-type arrangement and a mosaic-type arrangement, with the stripe-type arrangement having each of the pixels of four types of colors, red, blue, green, and an achromatic color, arranged successively side by side, and the mosaic-type arrangement having each of the pixels of the four types of colors successively arranged side by side in a vertical direction and a horizontal direction.

Although not exclusive, the polarized color filter portion may have pixels arranged in any one of a stripe-type arrangement, a delta-type arrangement, and a mosaic-type arrangement, with the stripe-type arrangement having each of the pixels of three types of colors, cyan, magenta, and yellow, arranged successively side by side, the delta-type arrangement having each of the pixels of the three types of colors arranged in a triangular shape, and the mosaic-type arrangement having each of the pixels of the three types of colors arranged successively side by side in a vertical direction and a horizontal direction.

Although not exclusive, the polarized light color filter portion may have pixels arranged in any one of a stripe-type arrangement, a delta-type arrangement, and a mosaic-type arrangement, with the stripe-type arrangement having each of the pixels of three types of colors, cyan, red, and an achromatic color, arranged successively side by side, the delta-type arrangement having each of the pixels of the three types of colors arranged in a triangular shape, and the mosaic-type arrangement having each of the pixels of the three types of colors arranged successively side by side in a vertical direction and a horizontal direction.

Although not exclusive, the polarized light color filter portion may have pixels arranged in either one of a stripe-type arrangement and a mosaic-type arrangement, with the stripe-type arrangement having each of the pixels of two types of colors, cyan and red, alternately arranged side by side, and the mosaic-type arrangement having each of the pixels of the two types of colors alternately arranged side by side in a vertical direction and a horizontal direction.

Although not exclusive, the glass base may have a thickness in a range of from 0.1 mm to 0.7 mm.

Although not exclusive, the reflecting color polarized light filter may further comprise a protective layer formed on the polarized light color filter portion.

According to still another aspect of the present invention, there is provided a reflecting color liquid crystal display device comprising a liquid crystal layer disposed between a pair of opposing liquid crystal orientation films; transparent electrodes disposed at outer surfaces of each of the orientation films; an upper glass base, a phase difference plate, and a front polarizing plate, which are laminated successively onto an outer surface of one of the transparent electrodes; and any one of the aforementioned reflecting color polarized light filters provided at an outer surface of the other of the transparent electrodes, either directly or through an overcoat layer, such that a face of a polarized light color filter portion of the reflecting color polarized light filter is in correspondence with the other of the transparent electrodes.

According to still another aspect of the prevent invention, there is provided a reflecting color liquid crystal display device comprising a liquid crystal layer disposed between a pair of opposing liquid crystal orientation films; transparent electrodes provided at outer surfaces of each of the orientation films; an upper glass base, a phase difference plate, and a front polarizing plate, which are laminated successively on an outer surface of one of the transparent electrodes; a lower glass base provided at an outer surface of the other of the transparent electrodes; and any one of the aforementioned reflecting color polarized light filters, disposed at an outer surface of the lower glass base, either directly or through an overcoat layer, such that a face of a polarized light color filter portion of the reflecting color polarized light filter is in correspondence with the other of the transparent electrodes.

Although not exclusive, the lower glass base may have a thickness in a range of from 0.1 to 0.7 mm.

BRIEF DESCRIPTION OF THE DRAWINGS

FIGS. 12A to 12D are plan views each showing a structural member after disassembly of the reflecting color liquid crystal display device in the first embodiment in accordance with the present invention, wherein FIG. 12A is a view showing the front polarizing plate, FIG. 12B is a view showing the phase difference plate, FIG. 12C is a view showing the panel portion, and FIG. 12D is a view showing the reflecting color polarized light filter.

DESCRIPTION OF THE PREFERRED EMBODIMENTS

A description will now be given of preferred embodiments of a reflecting color polarized light filter and a reflecting color liquid crystal display device in accordance with the present invention, with reference to the drawings.

Figure 1:
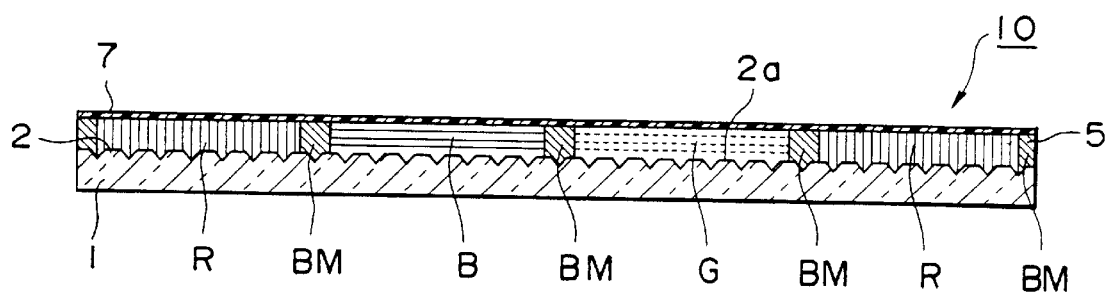
FIG. 1 is a sectional view of a reflecting color polarized light filter of a first embodiment in accordance with the present invention.

FIG. 1 is a sectional view of a reflecting color polarized filter in a first embodiment in accordance with the present invention.

The reflecting color polarized light filter 10 of the first embodiment includes a reflecting layer 2 provided at one face of a glass base 1, and a polarized light color filter portion 5 provided on the reflecting layer 2.

The type of glass base 1 used depends on the purpose for which the reflecting color polarized light filter 10 is used. If the reflecting color polarized light filter 10 is to be used in an STN color liquid crystal display device, the glass base 1 is ordinarily a base composed of, for example, a soda lime glass containing an oxide of an alkali metal, such as sodium. When the reflecting color polarized light filter 10 is to be used in a TFT color liquid crystal display device, the glass base 1 is composed of, for example, a non-alkali glass. The thickness of the glass base 1, though depending on the purpose for which the reflecting color polarized light filter 10 is used, is preferably in a range of from 0.1 mm to 0.7 mm, and more preferably in a range of from 0.1 mm to 0.4 mm. When the glass base 1 is thinner than 0.1 mm, the contrast becomes too low, whereas when the glass base 1 is thicker than 0.7 mm, parallax becomes large as a result of birefringence of the glass.

The reflecting layer 2 corresponds to a rough surface 2a formed by forming projections and depressions in the top surface of the glass base 1. The rough surface 2a acts to reflect and scatter light incident thereupon to increase the angle of field of view. The surface roughness Ra of the rough surface 2a is in a range of from 0.20 $\mu$m to 5.0 $\mu$m, and preferably 2.0 $\mu$m. When the surface roughness of the rough surface 2a is within the range of from 0.20 $\mu$m to 5.0 $\mu$m, and the reflecting color polarized light filter 10 of the present embodiment is used in a reflecting color liquid crystal display device, the effectiveness with which light incident upon the reflecting layer 2 with the rough surface 2a is scattered becomes larger, and shifting of the polarized light becomes small, thus increasing the contrast. In order to increase the reflection efficiency, a metal film, such as an aluminum (Al) film, may be formed on the rough surface 2a, and a transparent insulating film, such as a silicon oxide (Sio) or silicon dioxide (SiO$_2$) film, may be formed on the metal film.

The aforementioned polarized light color filter portion 5 is one in which pixels of three types of primary colors, red (R), blue (B), and green (G), are formed into a predetermined pattern, for example, by using photolithography techniques or by printing. In a parallel nicol state, the primary colors R, B, and G are very light and are produced nearly transparently, while, in a crossed nicol state, the three primary colors R, B, G, are dark and vivid.

Figure 2:
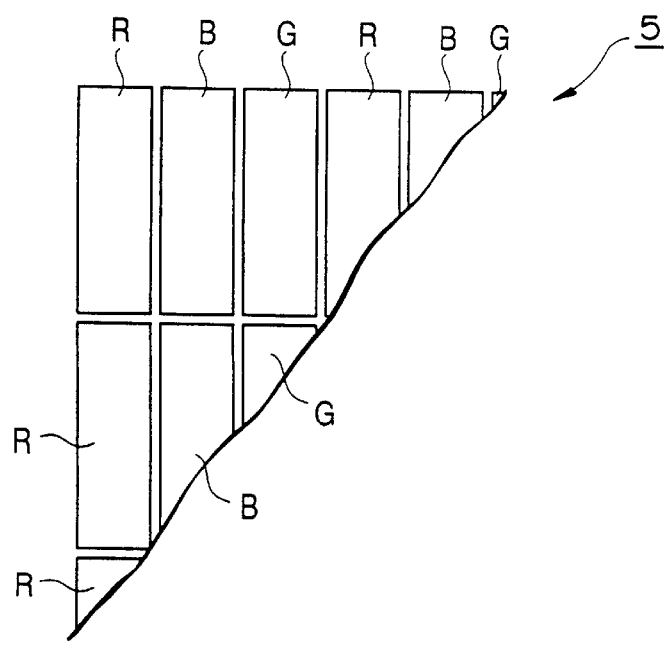
FIG. 2 is a front view showing a stripe-type pixel arrangement in a reflecting color polarized light filter in accordance with the present invention.
Figure 3:
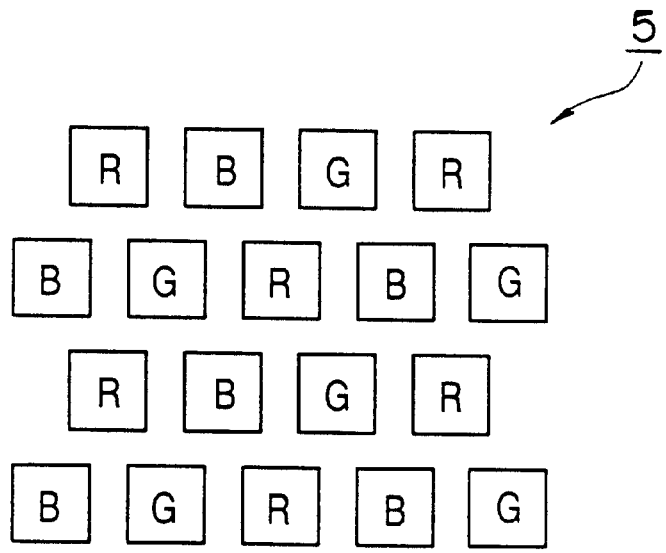
FIG. 3 is a front view showing a delta-type pixel arrangement in a reflecting color polarized light filter in accordance with the present invention.
Figure 4:
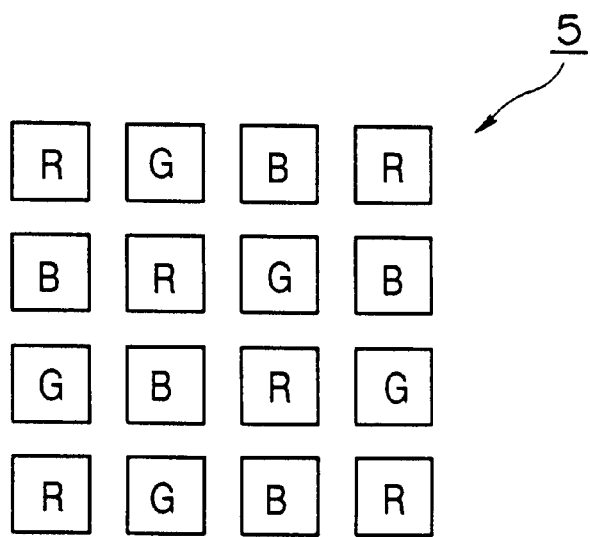
FIG. 4 is a front view of a mosaic-type pixel arrangement in a reflecting color polarized light filter in accordance with the present invention.

The pixel arrangement of the pattern of the polarized light color filter portion 5 is selected from the following three types: the stripe-type arrangement of FIG. 2, the delta-type arrangement of FIG. 3, or the mosaic-type arrangement of FIG. 4. In the stripe-type arrangement, pixels of three types of primary colors, R, B, and G, are arranged successively side by side. In the delta-type arrangement, pixels of the three types of colors are arranged into a triangular shape. In the mosaic-type arrangement, each of the pixels of the three types of primary colors is arranged successively side by side both vertically and horizontally.

In the polarized light color filter portion 5, a linear black matrix (hereinafter abbreviated "BM") may form a pattern around the pixels of the three types of primary colors, or neighboring pixels may be made to partly overlap each other. However, from the viewpoint of increasing contrast, it is preferable that a linear black matrix form a pattern around the pixels of the three types of primary colors. It is preferable that the BM be formed during formation of the R, G, and B pixels into a pattern, or after formation of such a pattern.

It is preferable that a protective layer 7 be formed on the polarized light color filter portion 5 in order to protect it. The protective layer 7 is made of a material which is highly adhesive with respect to the polarized light color filter portion 5, such as PVA or acrylic resin.

In the reflecting color polarized light filter 10 of the first embodiment, reflective layer 2 is formed on one face of the glass base 1, and the polarized light color filter portion 5 is formed on the reflective layer 2. Therefore, in using a panel structure in a normally white liquid crystal display device, when all of the dots are on, the resulting color is a dark mixed color of R, G, and B, that is the resulting color is black, whereas when all of the dots are off, the resulting color is nearly achromatic (or white). Depending on the on and off combination of the R, G, and B pixels, pixel display colors, as those given in Table 1, are produced. In addition, with a medium contrast, it is possible to produce multiple display colors. Since the light reflected from the reflective layer 2 directly enters the polarized light color filter portion 5, a sufficient quantity of light can be obtained, making it possible to use an R, G, and B color filter whose R, B, and G pixels are dark in color.

TABLE 1

| | Pixel Display Color | | | | | | | |
|---|---|---|---|---|---|---|---|---|
| Dot | White | Black | Red | Green | Blue | Yellow | Cyan | Magenta |
| R | OFF | ON | ON | OFF | OFF | ON | OFF | ON |
| G | OFF | ON | OFF | ON | OFF | ON | ON | OFF |
| B | OFF | ON | OFF | OFF | ON | OFF | ON | ON |

Figure 5:
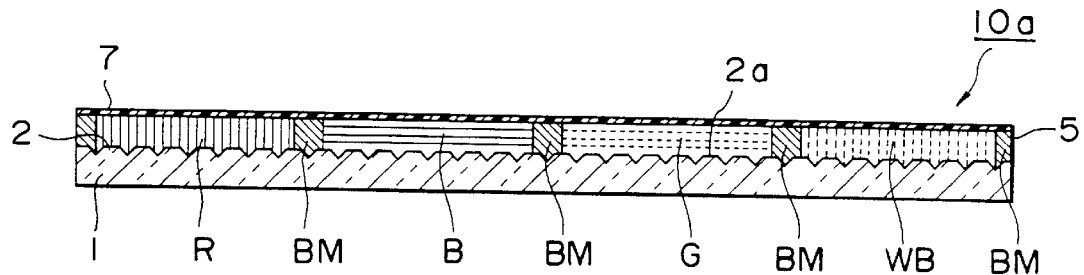
FIG. 5 is a sectional view of a reflecting color polarized light filter in a second embodiment in accordance with the present invention.

FIG. 5 is a sectional view of a reflecting color polarized light filter in a second embodiment in accordance with the present invention.

The reflecting color polarized light filter 10a of the second embodiment differs from the reflecting color polarized light filter 10 of the first embodiment of FIG. 1 in that either of the following types of pixel arrangements may be used in the polarized light color filter portion 5. These usable arrangement types are: (1) the stripe-type arrangement in which pixels of four types of primary colors, R, B, G, and an achromatic color (WB), are arranged successively side by side; and (2) a mosaic-type arrangement in which pixels of the four types of primary colors are arranged side by side successively both vertically and horizontally.

When a WB pixel is used in the liquid crystal display device, the WB pixel can be made black or white by controlling the on and off state of the pixel.

The reflecting color polarized light filter 10a of the second embodiment, which is constructed in the above-described manner, produces the same operational effects as those of the reflecting color polarized light filter 10 of the first embodiment.

Figure 6:
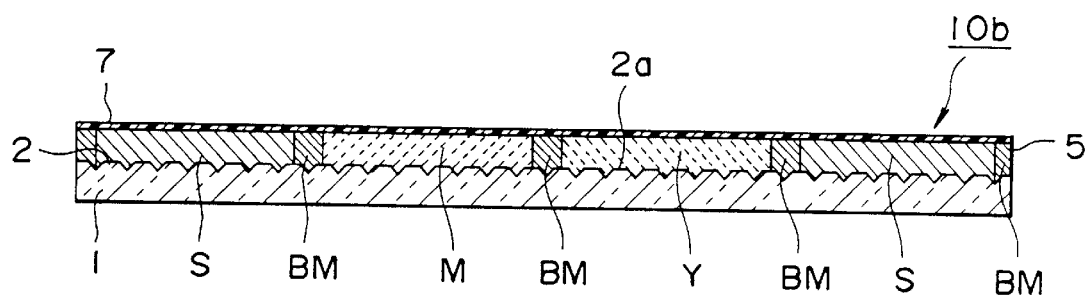
FIG. 6 is a sectional view of a reflecting color polarized light filter in a third embodiment in accordance with the present invention.

FIG. 6 is a sectional view of a reflecting color polarized light filter of a third embodiment in accordance with the present invention.

The reflecting color polarized light filter 10b of the third embodiment differs from the reflecting color polarized light filter 10 of the first embodiment of FIG. 1 in that any one of the following types of pixel arrangements may be used in the polarized light color filter portion 5. These usable arrangement types are: (1) the stripe-type arrangement in which pixels of three different colors, cyan (S), magenta (M), and yellow (Y), are arranged successively side by side; (2) the delta-type arrangement in which pixels of the three different colors are arranged to form a triangular shape; and (3) the mosaic-type arrangement in which pixels of the three different colors are arranged side by side successively both vertically and horizontally.

The reflecting color polarized light filter 10b, which is constructed in the above-described manner, produces the same operational effects as those of the reflecting color polarized light filter 10 of the first embodiment.

Figure 7:
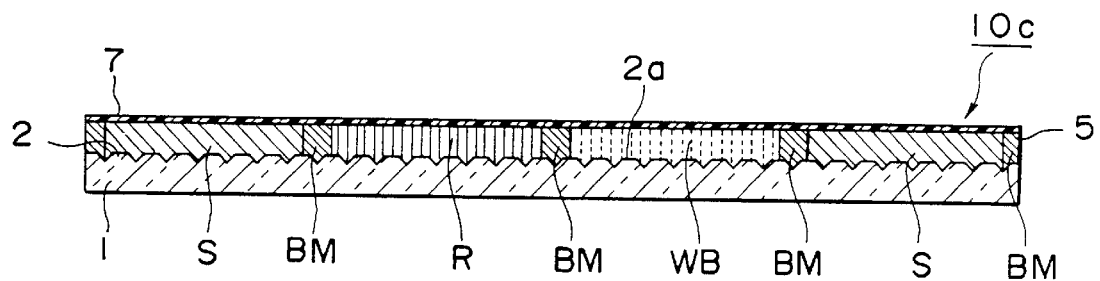
FIG. 7 is a sectional view of a reflecting color polarized light filter in a fourth embodiment in accordance with the present invention.

FIG. 7 is a sectional view of a reflecting color polarized light filter of a fourth embodiment in accordance with the present invention.

The reflecting color polarized light filter 10c of the fourth embodiment differs from the reflecting color polarized light filter 10 of the first embodiment of FIG. 1 in that any one of the following pixel arrangements may be used in the polarized light color filter portion 5. These usable arrangement types are: (1) the stripe-type arrangement in which pixels of three types of colors, S, R, and WB, are arranged successively side by side; (2) the delta-type arrangement in which pixels of the three types of colors are arranged to form a triangular shape; and (3) the mosaic-type arrangement in which pixels of the three types of colors are arranged successively side by side both vertically and horizontally.

When a WB pixel is used in the liquid crystal display device, the WB pixel turns black or white by controlling the on and off state of the pixel.

The reflecting color polarized light filter 10c of the fourth embodiment, which is constructed in the above-described manner, provides the same operational effects as those of the reflecting color polarized light filter 10 of the first embodiment.

Figure 8:
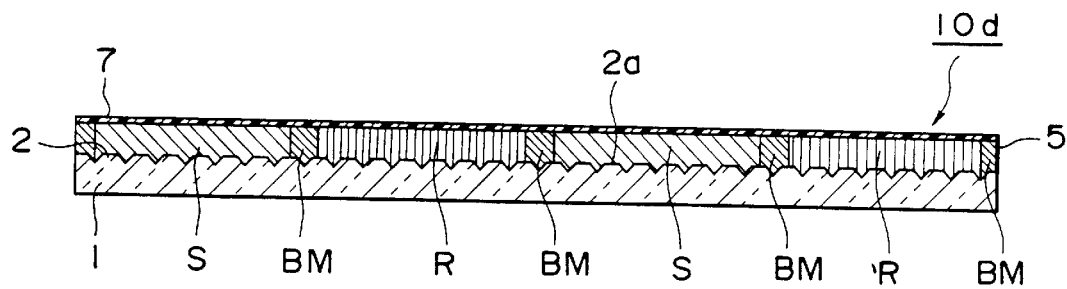
FIG. 8 is a sectional view of a reflecting color polarized light filter in a fifth embodiment in accordance with the present invention.

FIG. 8 is a sectional view of a reflecting color polarized light filter of a fifth embodiment in accordance with the present invention.

The reflecting color polarized light filter 10d of the fifth embodiment differs from the reflecting color polarized light filter 10 of the first embodiment of FIG. 1 in that either one of the following pixel arrangements may be used in the polarized light color filter portion 5. These usable arrangement types are: (1) the stripe-type arrangement in which pixels of two color types, S and R, are alternately arranged side by side; and (2) the mosaic-type arrangement in which pixels of the two color types are alternately arranged side by side both vertically and horizontally.

The reflecting color polarized light filter 10d of the fifth embodiment, which is constructed in the above-described manner, produces the same operational effects as those of the reflecting color polarized light filter 10 of the first embodiment.

Figure 9:
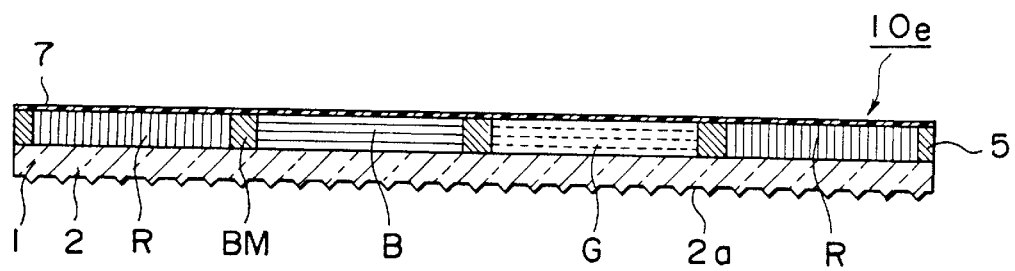
FIG. 9 is a sectional view of a reflecting color polarized light filter in a sixth embodiment in accordance with the present invention.

FIG. 9 is a sectional view of a reflecting color polarized light filter of a sixth embodiment in accordance with the present invention.

In the reflecting color polarized light filter 10e of the sixth embodiment, a polarized light color filter portion 5 is provided on one face of a glass base 1, and a reflecting layer 2 is provided on the other face of the glass base 1. The reflecting layer 2 corresponds to a rough surface 2a formed by forming projections and depressions in the lower surface of the glass base 1.

For the reflecting color polarized light filter 10e of the sixth embodiment, the rough surface of the reflecting layer 2 with projections and depressions does not affect the formation of a polarized light color filter portion 5 on a surface of the glass base 1 using photolithography techniques or the like, so that a polarized light color filter portion 5 with a fine pixel pitch can be formed.

It is preferable that a protective layer 7 be formed on the polarized light color filter portion 5.

Since the reflecting color polarized light filter 10e of the sixth embodiment is constructed in the above-described way, light reflected from the reflecting layer 2 passes through the glass base 1 and impinges directly upon the polarized light color filter portion 5. Therefore, a sufficient quantity of light can be obtained, making it possible to use an R, B, G color filter whose R, B, and G pixels are dark in color.

In order for a sufficient amount of light to be reflected, it is preferable that the glass base 1 be thin. Thus, the glass base 1 is formed into a thickness ranging from 0.1 mm to 0.7 mm.

Figure 10:
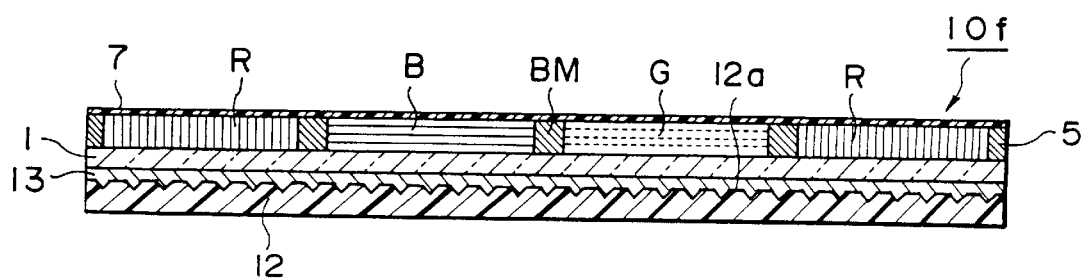
FIG. 10 is a sectional view of a reflecting color polarized light filter in a seventh embodiment in accordance with the present invention.

FIG. 10 is a sectional view of a reflecting color polarized filter of a seventh embodiment in accordance with the present invention.

The reflecting color polarized light filter 10f of the seventh embodiment differs from the reflecting color polarized light filter 10e of the sixth embodiment of FIG. 9 in that no rough surface 2a is formed in the glass base 1 and in that a plastic reflecting layer 12 is adhered to the lower surface of the glass base 1, using a transparent adhesive layer 13.

The reflecting layer 12, being plate-shaped, has projections and depressions 12a in the surface at the glass base 1 side. The reflecting layer 12 is made of a plastic sheet, such as a polyester resin sheet, which reinforces the glass base 1, even when the glass base 1 is made thin, such that light is sufficiently reflected.

The material used to form the transparent adhesive layer 13 is an acrylic material or the like.

Since the reflecting color polarized light filter 10f of the seventh embodiment is constructed in the above-described manner, the glass base 1 can be made thin, and a sufficient amount of light can be reflected, so that the colors of each of the pixels of the three types of primary colors, R, B, and G, are deep. In addition, the reflecting layer 12 becomes cheaper.

Figure 11:
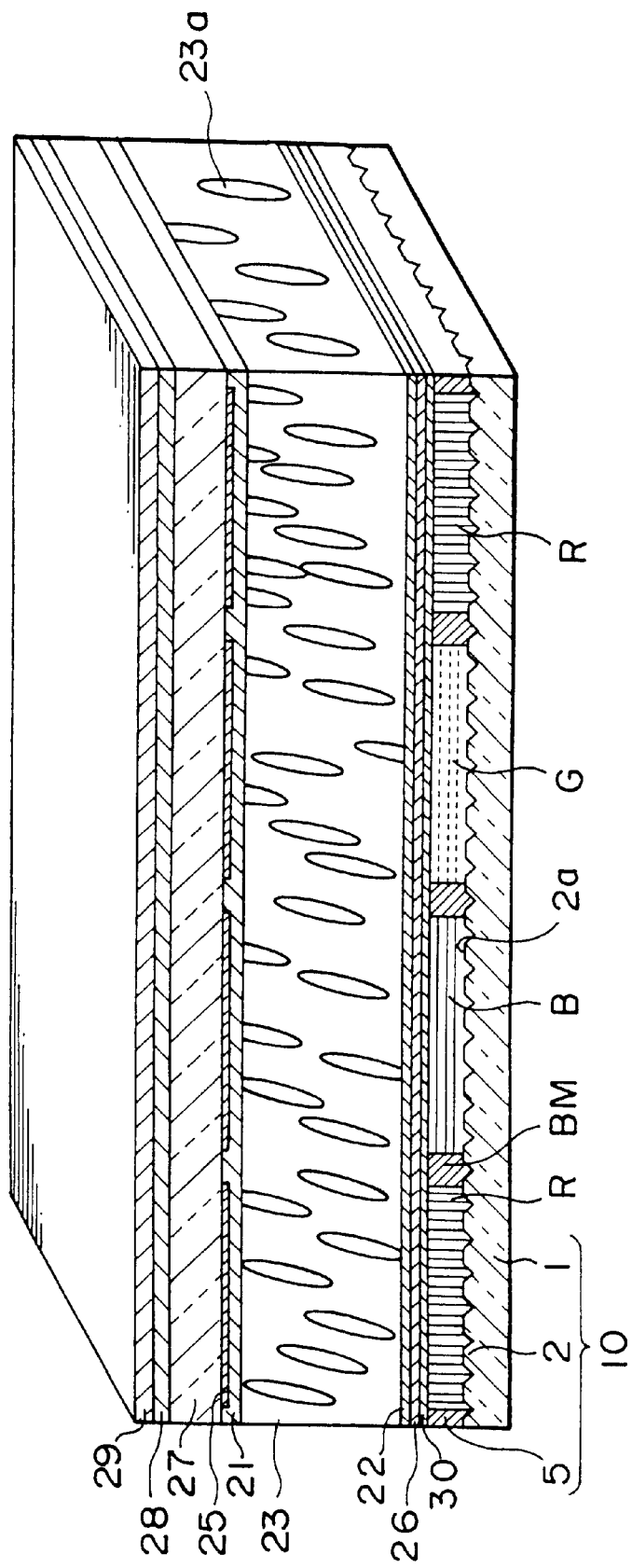
FIG. 11 is a perspective view of a reflecting color liquid crystal display device in a first embodiment in accordance with the present invention.

FIG. 11 is a perspective view showing a first embodiment of a reflecting color liquid crystal display device applied as a 240<-twisted STN reflecting color liquid crystal display device.

In the STN reflecting color liquid crystal device of the first embodiment, an STN liquid crystal layer 23 is disposed between a pair of opposing liquid crystal orientation films 21 and 22, and transparent electrodes 25 and 26 are provided at outer surfaces of the orientation films 21 and 22, respectively. An upper glass base 27, a phase difference plate 28, and a front polarizing plate 29 are laminated onto an outer surface of the transparent electrode 25. On the other hand, the above-described reflecting color polarized light filter 10 of the first embodiment is provided on an outer surface of the transparent electrode 26 through an overcoat layer 30, such that a face of a polarized color filter portion 5 is provided in correspondence with the transparent electrode 26.

The panel portion of the reflecting color liquid crystal display device of the first embodiment comprises the upper glass base 27, the glass base 1 of the reflecting color polarized light filter 10, and portions formed between these two bases 27 and 1.

The aforementioned protective layer 7 (not shown) is also laminated in the reflecting color polarized light filter 10 of the reflecting color liquid crystal display device of the first embodiment. Here, the thickness of the glass base 1 of the reflecting color polarized light filter 10 is not particularly limited, so that it can be made either thick or thin.

The liquid crystal orientation films 21 and 22 are commonly-used transparent orientation films, and are high-polymeric films, such as polyimide films, which have been subjected to rubbing.

In the present embodiment, the transparent electrodes 25 and 26, though depending on the type of liquid crystal display device, are the equivalent of data and scanning electrodes.

In addition, in the present embodiment, the upper glass base 27, though depending on the type of liquid crystal display device, is composed of soda lime glass, or the like.

Figure 18:
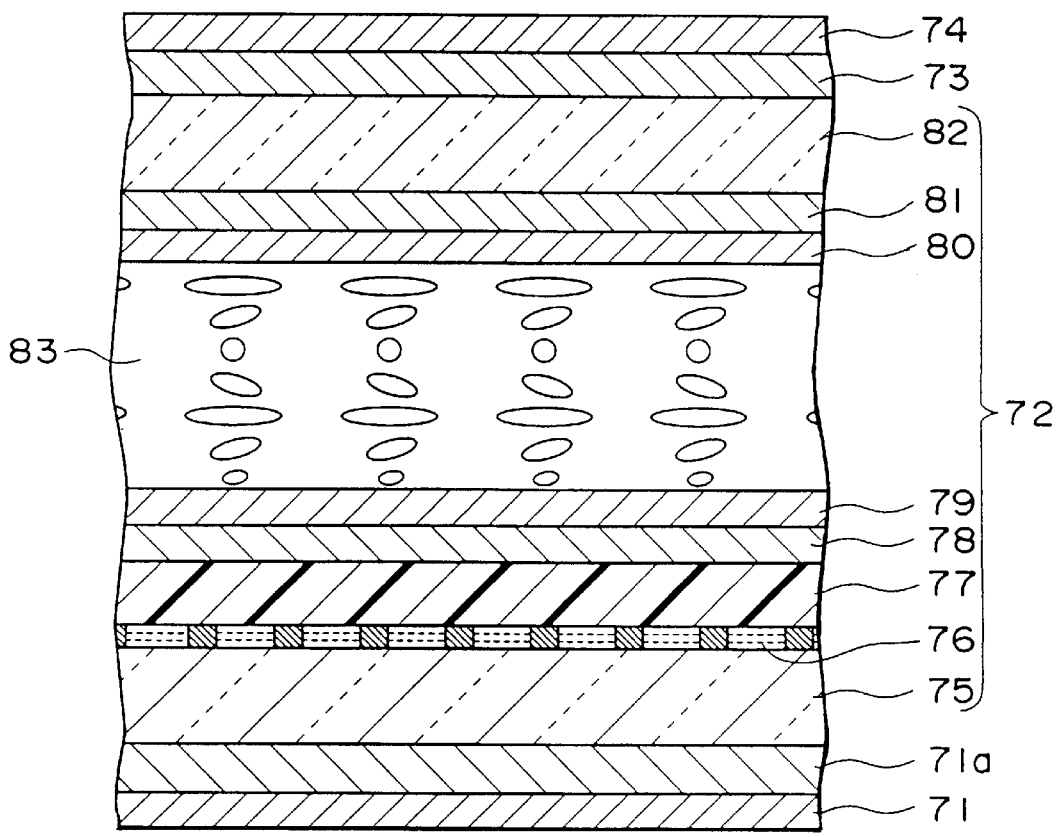
FIG. 18 is a sectional view of a conventional reflecting color liquid crystal display device.

The liquid crystal molecules 23a in the STN liquid crystal layer 23 stands up when a voltage is applied to the transparent electrodes 25 and 26, whereas they remain lying down when a voltage is not applied to the transparent electrodes 25 and 26, as shown in FIG. 18.

The phase difference plate 28 is composed of, for example, a uniaxially stretched polyvinyl alcohol film or polycarbonate film.

The overcoat layer 30 is made of silica, acrylic resin, or the like.

Figure 12A:
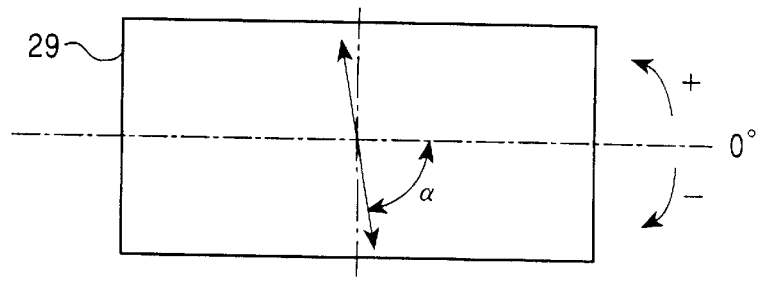
Figure 12B:
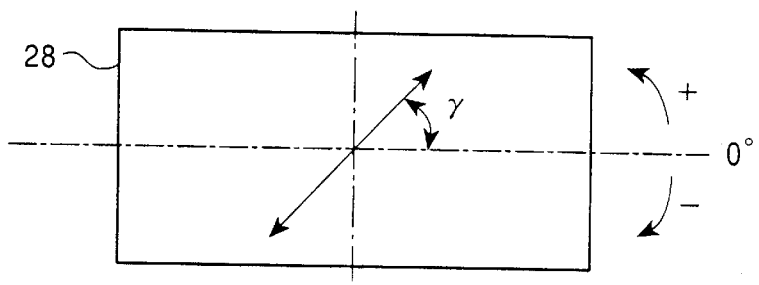
Figure 12C:
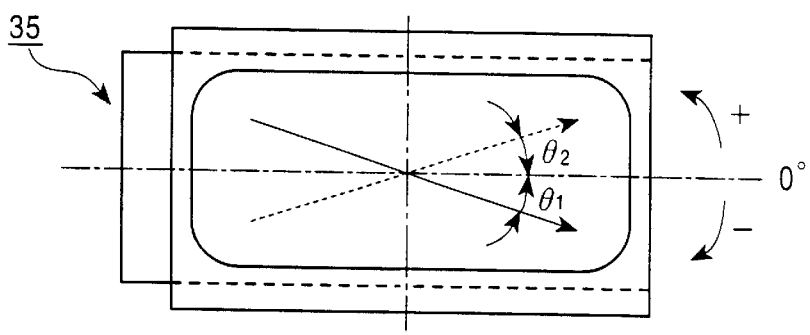
Figure 12D:
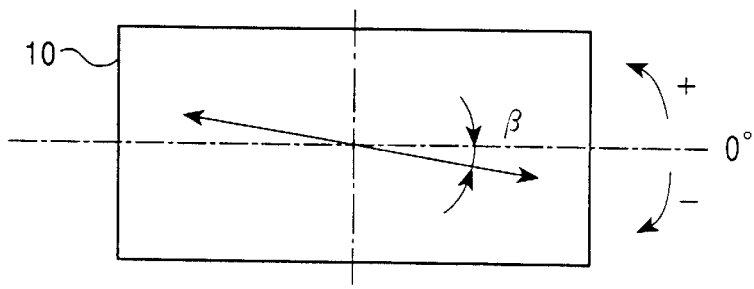

FIGS. 12A to 12D are plan views each showing a structural member after disassembly of the 240° twisted STN reflecting color liquid crystal display device of the first embodiment. More specifically, FIG. 12A shows the front polarizing plate 29; FIG. 12B shows the phase difference plate 28; FIG. 12C shows the panel portion 35; and FIG. 12D shows the reflecting color polarized light filter 10.

When, for example, the display is normally white (hereinafter abbreviated "N/W"), the optical specifications of the reflecting color liquid crystal display device of the first embodiment is such that $\alpha$ of an absorption axis of the front polarizing plate 29 is −77.5°, the retardation Rf of the phase difference plate 28 is 570 nm, $\gamma$ of an optical axis is 55°, the retardation Rp of the panel portion 35 is 840 nm, $\theta_1$ in a rubbing direction of the orientation film 21 at the phase difference plate 28 side is −30°, $\theta_2$ in a rubbing direction of the orientation film 22 at the polarized light color filter portion 5 side is 30°, and $\beta$ of an absorption axis of the reflecting color polarized light filter 10 is −20°. When, for example, the display is normally black (hereinafter abbreviated "N/B"), the optical specifications of the reflecting color liquid crystal display device of the first embodiment is such that a of the absorption axis of the front polarizing plate 29 is −85°, the retardation Rf of the phase difference plate 28 is 570 nm, $\gamma$ of the optical axis is 45°, the retardation Rp of the panel portion 35 is 840 nm, $\theta_1$ in the rubbing direction of the orientation film 21 at the phase difference plate 28 side is −30°, $\theta_2$ in the rubbing direction of the orientation film 22 at the polarized light color filter portion 5 side is 30°, and $\beta$ of the absorption axis of the reflecting color polarized light filter 101 is −70°.

A description will now be given of the method of display of the reflecting color liquid crystal display device of the first embodiment.

A linearly polarized light, which has passed through the front polarizing plate 29 at the light-incoming side and the phase difference plate 28, passes through the STN liquid crystal layer 23, as a result of which, when the device is turned off, the linearly polarized light is converted into an elliptically polarized light which oscillates nearly perpendicular to the absorption axis of the polarized light color filter portion 5 at the rear side of the device. Thus, the polarized light passes through the polarized light color filter portion 5, without being absorbed thereby, and reaches the reflecting layer 2. Then, the polarized light is reflected back, by the reflecting layer 2, towards the same path, and leaves the outer surface of the display device (bright state). On the other hand, when the device is turned on, the polarized light becomes an elliptically polarized light oscillating almost parallel to the absorption axis of the polarized light color filter portion 5, and the resulting elliptically polarized light is absorbed by the absorption axis of the polarized light color filter portion 5, in order to produce vivid colors in accordance with the absorption wavelength of the color filter portion 5.

The reflecting color liquid crystal display device of the first embodiment utilizes, in particular, the reflecting color polarized light filter 10 of the first embodiment that is capable of both polarizing and reflecting light, so that the colors of each of the pixels of the three primary colors, R, B, and G can be made dark. Thus, a vivid and deep multi-colored display can be realized.

Although the reflecting color liquid crystal display device of the first embodiment was described as having the reflecting color polarized light filter 10 provided at the outer surface of a transparent electrode 26 through an overcoat layer 30, the display device of the first embodiment may have the reflecting color polarized light filter 10 directly provided at the outer surface of the transparent electrode 26.

Figure 13:
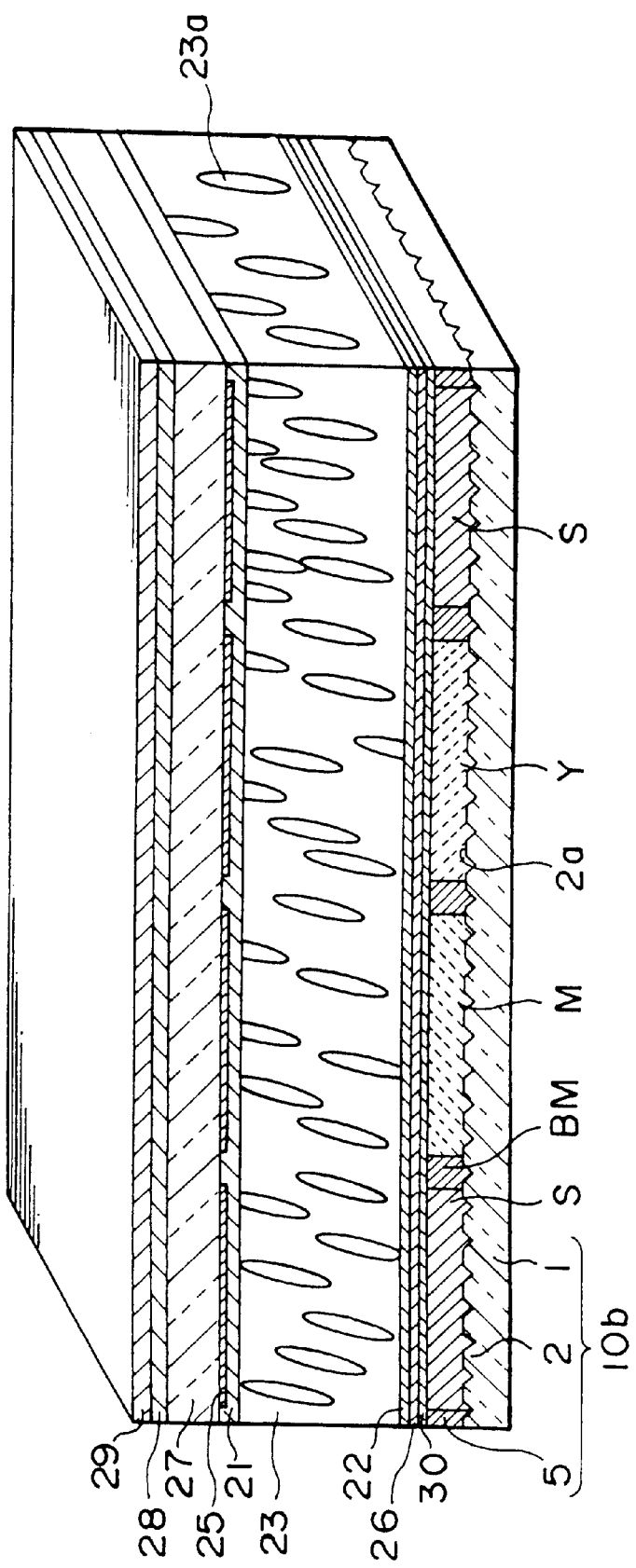
FIG. 13 is a perspective view showing a reflecting color liquid crystal display device in a second embodiment in accordance with the present invention.

FIG. 13 is a perspective view schematically showing the construction of an STN reflecting color liquid crystal display device of a second embodiment.

The STN reflecting color liquid crystal display device of the second embodiment differs from the STN reflecting color liquid crystal display device of the first embodiment of FIG. 11 in that it includes the color polarized light filter 10b of the third embodiment as the reflecting color polarized light filter.

The reflecting color liquid crystal display device of the second embodiment, which is constructed in the above-described manner, produces virtually the same operation effects as those of the reflecting color liquid crystal display device of the first embodiment.

Although the reflecting color liquid crystal display device of the second embodiment was described as including the reflecting color polarized light filter 10 of the third embodiment as the reflecting color polarized light filter, it may include any one of the reflecting color polarized light filter 10a of the second embodiment and the reflecting color polarized light filters 10c to 10f of the fourth to the seventh embodiments.

Since the reflecting layer 2 is formed on the upper surface of the glass base 1, a backlight can be provided at the lower (back) surface of the glass base 1 to make the display device a transmitting display device. Accordingly, the display device can be used as a reflecting type device in bright places and as a transmitting type device, using a backlight, in dark places.

Figure 14:
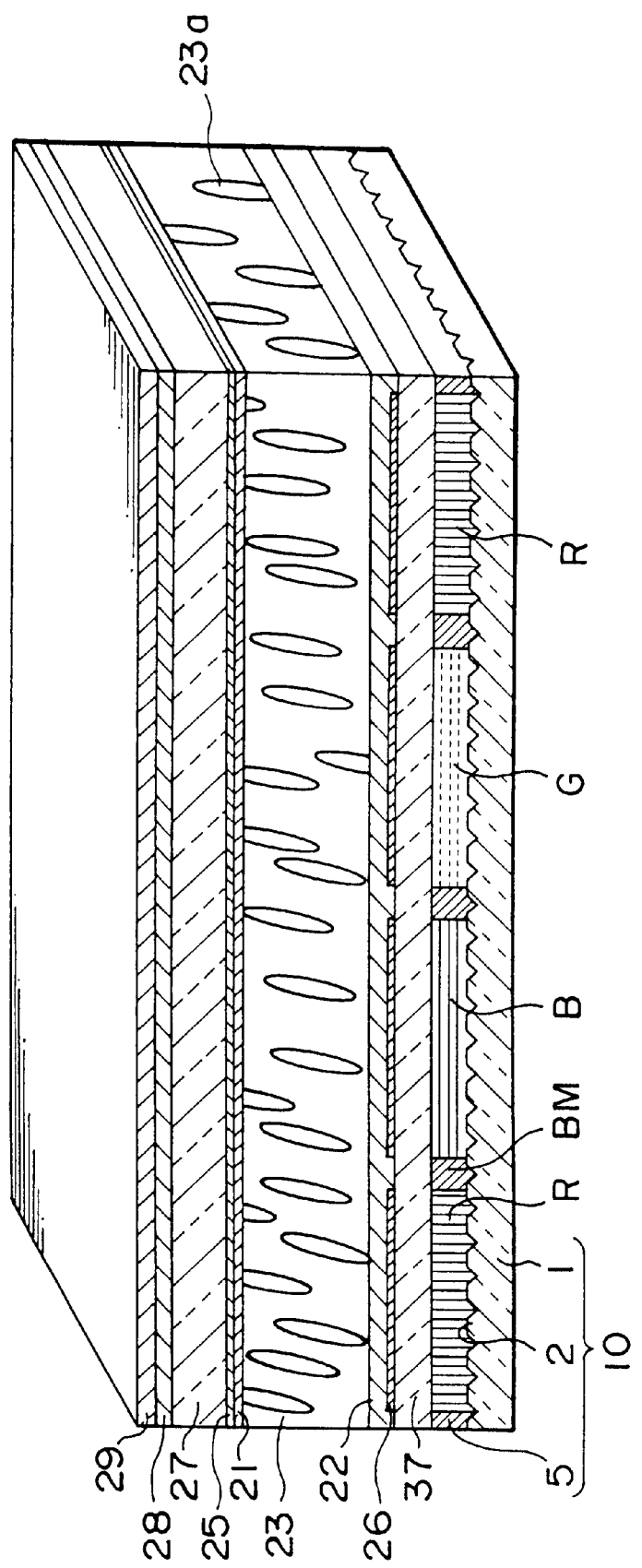
FIG. 14 is a perspective view showing a reflecting color liquid crystal display device in a third embodiment in accordance with the present invention.

FIG. 14 is a perspective view schematically showing the construction of an STN reflecting color liquid crystal display device of the third embodiment.

In the STN reflecting color liquid crystal display device of the third embodiment, an STN liquid crystal layer 23 is provided between a pair of opposing liquid crystal orientation films 21 and 22, and transparent electrodes 25 and 26 are disposed at outer surfaces of these orientation films 21 and 22. A glass base 27, a phase difference plate 28, and a polarizing plate 29 are successively laminated on an outer surface of the transparent electrode 25, while a lower glass base 37 is provided at an outer surface of the transparent electrode 26. The reflecting color polarized light filter 10 of the first embodiment is directly provided at an outer surface of the lower glass base 37, such that a face of the polarized light color filter portion 5 is formed in correspondence with the transparent electrode 26.

The panel portion of the reflecting color liquid crystal display device of the third embodiment comprises an upper glass base 27, a lower glass base 37, and portions provided between the bases 27 and 37.

The aforementioned protective layer 7 (not shown) is laminated on the reflecting color polarized light filter 10 of the reflecting color liquid crystal display device of the third embodiment. In order to reduce parallax, it is preferable that the lower glass base 37 be 0.1 to 0.7 mm thick. A thickness of 0.1 to 0.7 mm can prevent mixing of colors between adjacent color filter portions caused by parallax.

In the present embodiment, the lower glass base 37 is made of soda lime glass, or the like, though the material used for the lower glass base 37 depends on the type of liquid crystal display device.

The reflecting color liquid crystal display device of the third embodiment includes the reflecting color polarized light filter 10 capable of polarizing and reflecting light, so that the colors of each of the pixels of the three types of primary colors, R, B, and G can be made dark. Thus, a vivid and deep multi-colored display can be realized.

Although the reflecting color liquid crystal display device of the third embodiment was described as having the reflecting color polarized light filter 10 of the first embodiment directly provided at the outer surface of the lower glass base 37, the display device may have the reflecting color polarized light filter 10 provided at the outer surface of the lower glass base 37 through an overcoat layer.

Figure 15:
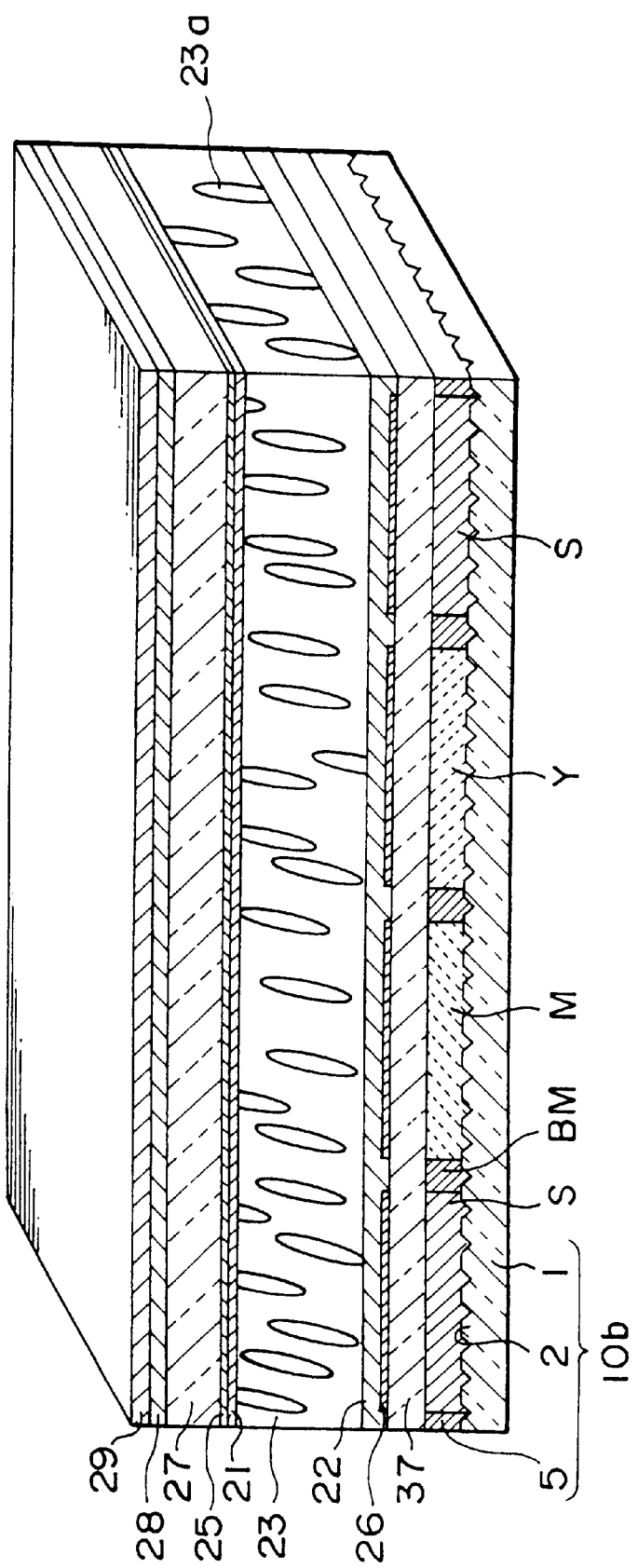
FIG. 15 is a perspective view of a reflecting color liquid crystal display device in a fourth embodiment in accordance with the present invention.

FIG. 15 is a perspective view schematically showing the construction of an STN reflecting color liquid crystal display device of a fourth embodiment.

The STN reflecting color liquid crystal display device of the fourth embodiment differs from the STN reflecting color liquid crystal display device of the third embodiment of FIG. 14 in that it includes the color polarized light filter 10b of the third embodiment as the reflecting color polarized light filter.

The reflecting color liquid crystal display device of the fourth embodiment, which is constructed in the above-described manner, provides virtually the same operational effects as those of the STN reflecting color liquid crystal display device of the third embodiment.

Although the reflecting color liquid crystal display device of the fourth embodiment was described as including the reflecting color polarized light filter 10b of the third embodiment as the reflecting color polarized light filter, the display device may include any one of the reflecting color polarized light filter 10a of the second embodiment and the reflecting color polarized light filters 10c to 10f of the fourth to seventh embodiments.

Figure 16:
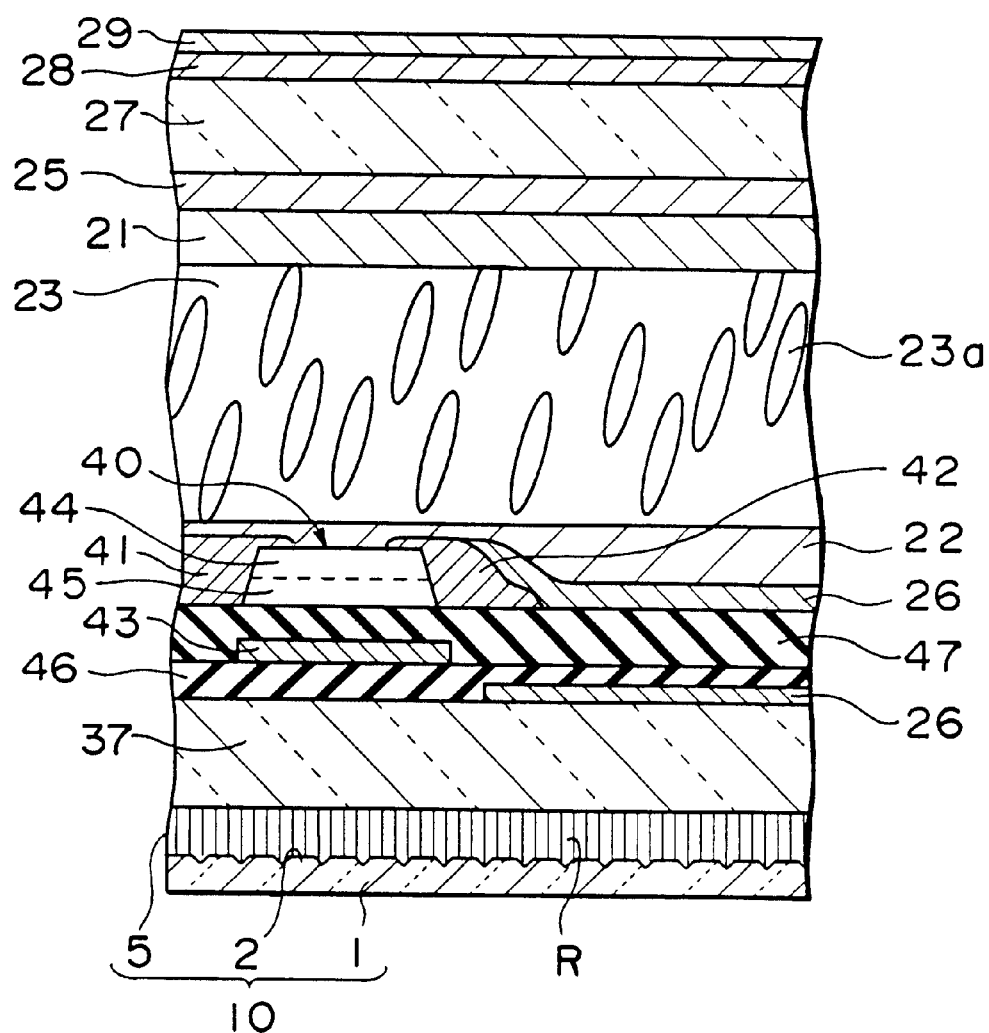
FIG. 16 is a partial sectional view of a reflecting color liquid crystal display device in a fifth embodiment in accordance with the present invention.

FIG. 16 is a partial sectional view of a reflecting color liquid crystal display device of a fifth embodiment.

The reflecting color liquid crystal display device of the fifth embodiment is described as a TFT reflecting color liquid crystal display device using amorphous silicon (a-Si).

The TFT reflecting color liquid crystal display device of the fifth embodiment differs from the STN reflecting color liquid crystal display device of the third embodiment of FIG. 14 particularly in that a thin-film transistor (TFT) 40, in addition to the transparent electrode 26, is provided above the lower glass base 37 so as to be in correspondence with each of the pixels. In FIG. 16, reference numeral 41 denotes a source electrode, reference numeral 42 denotes a drain electrode, reference numeral 43 denotes a gate electrode, reference numeral 44 denotes n+amorphous silicon, reference numeral 45 denotes amorphous silicon, reference numeral 46 denotes an insulating layer made of silicon dioxide ($SiO_2$) or the like, and reference numeral 47 denotes an Si nitride film.

The reflecting color liquid crystal display device of the fifth embodiment includes the reflecting color polarized light filter 10 of the first embodiment capable of polarizing and reflecting light, so that the colors of each of the pixels of the three types of primary colors, R, B, and G, are deep. Thus, a vivid and deep multi-colored display can be provided.

Although the TFT reflecting color liquid crystal display device of the fifth embodiment was described as including the reflecting color polarized light filter 10 of the first embodiment as the reflecting color polarized light filter, the display device may include any one of the reflecting color polarized light filters 10a to 10f of the second to seventh embodiments.

Although the reflecting color liquid crystal display device of the fifth embodiment in accordance with the present invention was described as being an a-Si-TFT reflecting color liquid crystal display device, it may be a polycrystalline Si-TFT reflecting color liquid crystal display device.

Figure 17:
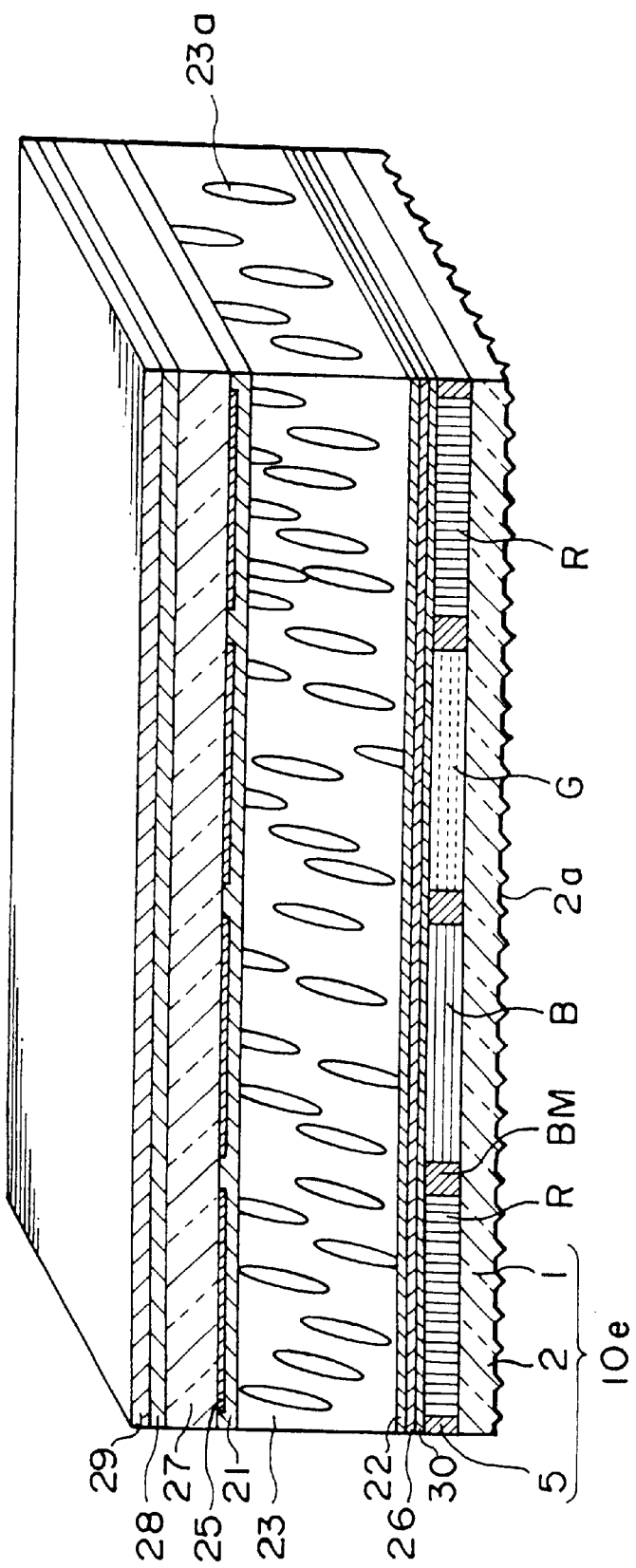
FIG. 17 is a perspective view of a reflecting color liquid crystal display device in a sixth embodiment in accordance with the present invention.

FIG. 17 is a perspective view schematically showing the construction of an STN reflecting color liquid crystal display device of a sixth embodiment.

The STN reflecting color liquid crystal display device of the sixth embodiment differs from the STN reflecting color liquid crystal display device of the first embodiment of FIG. 11 in that it includes the color polarized light filter 10e of the sixth embodiment as the reflecting color polarized light filter.

Since the reflecting color liquid crystal display device of the sixth embodiment is constructed in the above-described manner, the colors of each of the pixels of the three types of primary colors, R, B, and G, can be made dark. Thus, a vivid and deep multi-colored display can be realized. In addition, in the color polarized light filter 10e of the sixth embodiment used in the liquid crystal display device, the polarized light color filter portion 5 can be formed with fine pixel pitches, thereby allowing a larger number of pixels to be formed, making it possible to improve resolution.

As can be understood from the foregoing description, the reflecting color polarized light filter of the present invention is capable of both polarizing and reflecting light, so that the colors of the pixels can be made dark.

In addition, when a reflecting color polarized light filter capable of polarizing and reflecting light of the present invention is used in a reflecting color liquid crystal display device in accordance with the present invention, the colors of the pixels are deep, so that a deep and vivid multi-colored display can be realized.

What is claimed is:

1. a reflecting color polarized light filter, comprising:

a glass base;

a single-layered polarized light color filter portion provided at one face of said glass base, said polarized light color filter portion having pixels of a plurality of primary colors with a polarizing function planarly arranged in a predetermined pattern; and a reflecting layer provided at an opposing face of said glass base, said reflecting layer having corrugations and reflecting and deflecting light transmitted through said polarized light color filter portion, wherein said polarized light color filter portion has pixels arranged in one of a stripe-type arrangement, a delta-type arrangement, and a mosaic-type arrangement, with the stripe-type arrangement each of the pixels of three types of primary colors, red, blue, and green, arranged successively side by side, the delta- type arrangement having each of the pixels of the three types of primary colors arranged in a triangular shape, and the mosaic-type arrangement having each of the pixels of the three types of primary colors arranged successively side by side in a vertical direction and a horizontal direction, and wherein the pixels have a parallel Nicol state in which the three types of primary colors are light and nearly transparent, and a crossed Nicol state in which the three types of primary colors are dark.

2. A reflecting color polarized light filter according to claim 1, wherein said reflecting layer, made of plastic, has a surface with projections and depressions.

3. A reflecting color polarized light filter according to claim 2, wherein said plastic reflecting layer is adhered to said glass base through a transparent adhesive layer.

4. A reflecting color polarized light filter according to claim 1, wherein said glass base has a thickness in a range of from 0.1 mm to 0.7 mm.

5. A reflecting color polarized light filter according to claim 1, said reflecting layer having a rough surface formed on said glass base.

6. A reflecting color polarized light filter according to claim 5, further comprising a metal film and a transparent insulating formed on said rough surface.

7. A reflecting color polarized light filter according to claim 1, further comprising a protective layer formed on said polarized light color filter portion.

8. A reflecting color polarized light filter, comprising:
a glass base;
a single-layered polarized light color filter portion provided at one face of said glass base, said polarized light color filter portion having pixels of a plurality of primary colors with a polarizing function planarly arranged in a predetermined pattern; and
a reflecting layer provided at an opposing face of said glass base, said reflecting layer having corrugations and reflecting and deflecting light transmitted through said polarized light color filter portion,
wherein said polarized light color filter portion is arranged in one of a stripe-type arrangement and a mosaic-type arrangement, with the stripe-type arrangement having each of the pixels of four types of colors, red, blue, green, and an achromatic color, arranged successively side by side, and the mosaic-type arrangement having each of the pixels of the four types of colors successively arranged side by side in a vertical direction and a horizontal direction, and
wherein the pixels have a parallel Nicol state in which the four types of primary colors are light and nearly transparent, and a crossed Nicol state in which the four types of primary colors are dark, 9. A reflecting color polarized light filter according to claim 8, wherein said reflecting layer, made of plastic, has a surface with projections and depressions.

10. A reflecting color polarized light filter according to claim 9, wherein said plastic reflecting layer is adhered to said glass base through a transparent adhesive layer.

11. A reflecting color polarized light filter according to claim 8, wherein said glass base has a thickness in a range of from 0.1 mm to 0.7 mm.

12. A reflecting color polarized light filter according to claim 8, further comprising a protective layer formed on said polarized light color filter portion.

13. A reflecting color polarized light filter according to claim 8, said reflecting layer having a rough surface formed on said glass base.

14. A reflecting color polarized light filter according to claim 13, further comprising a metal film and a transparent insulating layer formed on said rough surface.

15. A reflecting color polarized light filter, comprising:
a glass base;
a single-layered polarized light color filter portion provided at one face of said glass base, said polarized light color filter portion having pixels of a plurality of primary colors with a polarizing function planarly arranged in a predetermined pattern; and
a reflecting layer provided at an opposing face of said glass base, said reflecting layer having corrugations and reflecting and deflecting light transmitted through said polarized light color filter portion,
wherein said polarized color filter portion has pixels arranged in one of a stripe-type arrangement, a delta-type arrangement, and a mosaic-type arrangement, with the stripe-type arrangement having each of the pixels of three types of colors, cyan, magenta, and yellow, arranged successively side by side, the delta-type arrangement having each of the pixels of the three types of colors arranged in a triangular shape, and the mosaic-type arrangement having each of the pixels of the three types of colors arranged side by side in a vertical direction and a horizontal direction, and
wherein the pixels have a parallel Nicol state in which the three types of primary colors are light and nearly transparent and a crossed Nicol state in which the three types of primary colors are dark.

16. A reflecting color polarized light filter according to claim 15, wherein said reflecting layer, made of plastic, has a surface with projections and depressions.

17. A reflecting color polarized light filter according to claim 16, wherein said plastic reflecting layer is adhered to said glass base through a transparent adhesive layer.

18. A reflecting color polarized light filter according to claim 15, wherein said glass base has a thickness in a range of from 0.1 mm to 0.7 mm.

19. A reflecting color polarized light filter according to claim 15, further comprising a protective layer formed on said polarized light color filter portion.

20. A reflecting color polarized light filter according to claim 15, said reflecting layer having a rough surface formed on said glass base.

21. A reflecting color polarized light filter according to claim 20, further comprising a metal film and a transparent insulating layer formed on said rough surface.

22. A reflecting color polarized light filter, comprising:
a glass base;
a single-layered polarized light color filter portion provided at one face of said glass base, said polarized light color filter portion having pixels of a plurality of primary colors with a polarizing function planarly arranged in a predetermined pattern; and
a reflecting layer provided at an opposing face of said glass base, said reflecting layer having corrugations and reflecting and deflecting light transmitted through said polarized light color filter portion.
wherein said polarized light color filter portion has pixels arranged in one of a stripe-type arrangement, a delta-type arrangement, and a mosaic-type arrangement, with the stripe-type arrangement having each of the pixels of three types of colors, cyan, red, and an achromatic color, arranged successively side by side, the delta-type arrangement having each of the pixels of the three types of colors arranged in a triangular shape, and the mosaic-type arrangement having each of the pixels of the three types of colors arranged side by side successively in a vertical direction and a horizontal direction, and
wherein the pixels have a parallel Nicol state in which the three types of primary colors are light and nearly transparent and a crossed Nicol state in which the three types of primary colors are dark.

23. A reflecting color polarized light filter according to claim 22, wherein said reflecting layer, made of plastic, has a surface with projections and depressions.

24. A reflecting color polarized light filter according to claim 23, wherein said plastic reflecting layer is adhered to said glass base through a transparent adhesive layer.

25. A reflecting color polarized light filter according to claim 22, wherein said glass base has a thickness in a range of from 0.1 mm to 0.7 mm.

26. A reflecting color polarized light filter according to claim 22, further comprising a protective layer formed on said polarized light color filter portion.

27. A reflecting color polarized light filter according to claim 22, said relecting layer having a rough surface formed on said glass base.

28. A reflecting color polarized light filter according to claim 27, further comprising a metal film and a transparent insulating layer formed on said rough surface.

29. A reflecting color polarized light filter, comprising:
   a glass base;
   a single-layered polarized light color filter portion provided at one face of said glass base, said polarized light color filter portion having pixels of a plurality of primary colors with a polarizing function planarly arranged in a predetermined pattern; and
   a reflecting layer provided at an opposing face of said glass base, said reflecting layer having corrugations and reflecting and deflecting light transmitted through said polarized light color filter portion,
   wherein said polarized light color filter portion has pixels arranged in one of a stripe-type arrangement and a mosaic-type arrangement, with the stripe-type arrangement having each of the pixels of two types of colors, cyan and red, alternately arranged side by side, and the mosaic-type arrangement having each of the pixels of the two types of colors alternately arranged side by side in a vertical direction and a horizontal direction, and
   wherein the pixels have a parellel Nicol state in which the two types of primary colors are light and nearly transparent and a crossed Nicol state in which the two types of primary colors are dark.

30. A reflecting color polarized light filter according to claim 29, wherein said reflecting layer, made of plastic, has a surface with projections and depresssions.

31. A reflecting color polarized light filter according to claim 30, wherein said plastic reflecting layer is adhered to said glass base through a transparent adhesive layer.

32. A reflecting color polarized light filter according to claim 29, wherein said glass base has a thickness in a range of from 0.1 mm to 0.7 mm.

33. A reflecting color polarized light filter according to claim 29, further comprising a protective layer formed on said polarized light color filter portion.

34. A reflecting color polarized light filter according to claim 29, said reflecting layer having a rough surface formed on said glass base.

35. A reflecting color polarized light filter according to claim 34, further comprising a metal film and a transparent insulating layer formed on said rough surface.

36. A reflecting color liquid crystal display device, comprising:
   a reflecting color polarized light filter, comprising:
      a glass base;
      a single-layered polarized light color filter portion provided at one face of said glass base, said polarized light color filter portion having pixels of a plurality of primary colors with a polarizing function planarly arranged in a predetermined pattern; and
      a reflecting layer having corrugations and provided at an opposing face of said glass base.
      wherein said reflecting layer reflects and deflects light transmitted through said polarized light color filter portion;
   a liquid crystal layer disposed between a pair of opposing liquid crystal orientation films;
   transparent electrodes disposed at outer surfaces of each of said orientation films;
   an upper glass base, a phase difference plate, and a front polarizing plate, which are laminated successively onto an outer surface of one of said transparent electrodes; and
   said reflecting color polarized light filter provided at an outer surface of the other of said transparent electrodes, one of directly and through an overcoat layer, such that a face of said polarized light color filter portion of said reflecting color polarized light filter is physically aligned with the other of said transparent electrodes,
   wherein said polarized light color filter portion has pixels arranged in one of a stripe-type arrangement, a delta-type arrangement, and a mosaic-type arrangement, with the stripe-type arrangement having each of the pixels of three types of primary colors, red, blue, and green, arranged successively side by side, delta- type arrangement having each of the pixels of the three types of primary colors arranged in a triangular shape, and the mosaic-type arrangement having each of the pixels of the three types of primary colors arranged successively side by side in a vertical direction and a horizontal direction, and
   wherein the pixels have a parellel Nicol state in which the three types of primary colors are light and nearly transparent and a crossed Nicol state in which the three types of primary colors are dark.

37. A reflecting color liquid crystal display device, comprising:
   a reflecting color polarized light filter, comprising:
      a glass base;
      a single-layered polarized light color filter portion provided at one face of said glass base, said polarized light color filter portion having pixels of a plurality of primary colors with a polarizing function planarly arranged in a predetermined pattern; and
      a reflecting layer having corrugations and provided at an opposing face of said glass base;
      wherein said reflecting layer reflects and deflects light transmitted through said polarized light color filter portion;
   a liquid crystal layer disposed between a pair of opposing liquid crystal orientation films;
   transparent electrodes disposed at outer surfaces of each of said orientation films;
   an upper glass base, a phase difference plate, and a front polarizing plate, which are laminated successively onto an outer surface of one of said transparent electrodes; and
   said reflecting color polarized light filter provided at an outer surface of the other of said transparent electrodes, one of directly and through an overcoat layer, such that a face of said polarized light color filter portion of said reflecting color polarized light filter is physically aligned with the other of said transparent electrodes,
   wherein said polarized light color filter portion is arranged in one of a stripe-type arrangement and a mosaic-type arrangement, with the stripe-type arrangement having each of the pixels of four types of colors, red, blue, green, and an achromatic color, arranged successively side by side, and the mosaic-type arrangement having each of the pixels of the four types of colors successively arranged side by side in a vertical direction and a horizontal direction, and
   wherein the pixels have a parallel Nicol state in which the four types of primary colors are light and nearly transparent and a crossed Nicol state in which the four types of primary colors are dark.

38. A reflecting color liquid crystal display device, comprising:
- a reflecting color polarized light filter, comprising:
  - a glass base;
  - a single-layered polarized light color filter portion provided at one face of said glass base, said polarized light color filter portion having pixels of a plurality of primary colors with a polarizing function planarly arranged in a predetermined pattern; and
  - a reflecting layer having corrugations and provided at an opposing face of said glass base;
  - wherein said reflecting layer reflects and deflects light transmitted through said polarized light color filter portion;
- a liquid crystal layer disposed between a pair of opposing liquid crystal orientation films;
- transparent electrodes disposed at outer surfaces of each of said orientation films;
- an upper glass base, a phase difference plate, and a front polarizing plate, which are laminated successively onto an outer surface of one of said transparent electrodes; and
- said reflecting color polarized light filter provided at an outer surface of the other of said transparent electrodes, one of directly and through an overcoat layer, such that a face of said polarized light color filter portion of said reflecting color polarized light filter is physically aligned with the other of said transparent electrodes,
- wherein said polarized color filter portion has pixels arranged in one of a stripe-type arrangement, a delta-type arrangement, and a mosaic-type arrangement, with the stripe-type arrangement having each of the pixels of three types of colors, cyan, magneta, and yellow, arranged successively side by side, the delta-type arrangement having each of the pixels of the three types of colors arranged in a triangular shape, and the mosaic-type arrangement having each of the pixels of the three types of colors arranged side by side in a vertical direction and a horizontal direction, and
- wherein the pixels have a parallel Nicol state in which the three types of primary colors are light and nearly transparent and a crossed Nicolstate in which the three types of primary colors are dark.

39. A reflecting color liquid crystal display device, comprising:
- a reflecting color polarized light filter, comprising:
  - a glass base;
  - a single-layered polarized light color filter portion provided at one face of said glass base, said polarized light color filter portion having pixels of a plurality of primary colors with a polarizing function planarly arranged in a predetermined pattern; and
  - a reflecting layer having corrugations and provided at an opposing face of said glass base;
  - wherein said reflecting layer reflects and deflects light transmitted through said polarized light color filter portion;
- a liquid crystal layer disposed between a pair of opposing liquid crystal orientation films;
- transparent electrodes disposed at outer surfaces of each of said orientation films;
- an upper glass base, a phase difference plate, and a front polarizing plate, which are laminated successively onto an outer surface of one of said transparent electrodes; and
- said reflecting color polarized light filter provided at an outer surface of the other of said transparent electrodes, one of directly and through an overcoat layer, such that a face of said polarized light color filter portion of said reflecting color polarized light filter is physically aligned with the other of said transparent electrodes,
- wherein said polarized light color filter portion has pixels arranged in one of a stripe-type arrangement, a delta-type arrangement, and a mosaic-type arrangement, with the stripe-type arrangement having each of the pixels of three types of colors, cyan, red, and a achromatic color, arranged successively side by side, the delta-type arrangement having each of the pixels of the three types of colors arranged in a triangular shape, and the mosaic-type arrangement having each of the pixels of the three types of colors arranged side by side successively in a vertical direction and a horizontal direction, and
- wherein the pixels have a parallel Nicol state in which the three types of primary colors are light and nearly transparent and a crossed Nicol state in which the three types of primary colors are dark.

40. A reflecting color liquid crystal display device, comprising:
- a reflecting color polarized light filter, comprising:
  - a glass base;
  - a single-layered polarized light color filter portion provided at one face of said glass base, said polarized light color filter portion having pixels of a plurality of primary colors with a polarizing function planarly arranged in a predetermined pattern; and
  - a reflecting layer having corrugations and provided at an opposing face of said glass base;
  - wherein said reflecting layer reflects and deflects light transmitted through said polarized light color filter portion;
- a liquid crystal layer disposed between a pair of opposing liquid crystal orientation films;
- transparent electrodes disposed at outer surfaces of each of said orientation films;
- an upper glass base, a phase difference plate, and a front polarizing plate, which are laminated successively onto an outer surface of one said transparent electrodes; and
- said reflecting color polarized light filter provided at an outer surface of the other of said transparent electrodes, one of directly and through an overcoat layer, such that a face of said polarized light color filter portion of said reflecting color polarized light filter is physically aligned with the other of said transparent electrodes,
- wherein said polarized light color filter portion has pixels arranged in one of a stripe-type arrangement and a mosaic-type arrangement, with the stripe-type arrangement having each of the pixels of two types of colors, cyan and red, alternately arranged side by side, and the mosaic-type arrangement having each of the pixels of the two types of colors alternately arranged side by side in a vertical direction and a horizontal direction, and
- wherein the pixels have a parallel Nicol state in which the two types of primary colors are light and nearly transparent and a crossed Nicol state in which the two types of primary colors are dark.

* * * * *

UNITED STATES PATENT AND TRADEMARK OFFICE
CERTIFICATE OF CORRECTION

PATENT NO. : 6,476,888 B2
DATED : November 5, 2002
INVENTOR(S) : Fumiaki Yamanashi It is certified that error appears in the above-identified patent and that said Letters Patent is hereby corrected as shown below:

Title page,
Item [30], Foreign Application Priority Data, delete "8-328957" and substitute -- 8-328954 -- in its place.

Column 12,
Line 37, delete "a" and substitute -- A -- in its place.
Line 54, delete "delta- type" and substitute -- delta-type -- in its place.

Column 13,
Line 12, after "insulating" insert -- layer --.

Column 14,
Line 45, after "portion" delete "." (period) and substitute -- , -- (comma) in its place.

Column 16,
Line 18, delete "delta- type" and substitute -- delta-type -- in its place.

Signed and Sealed this

Eighteenth Day of March, 2003

JAMES E. ROGAN
*Director of the United States Patent and Trademark Office*